(12) United States Patent     (10) Patent No.:   US 12,634,299 B2

Chihaia et al.     (45) Date of Patent:     May 19, 2026

(54) THREAT PREDICTION IN A STREAMING SYSTEM

(71) Applicant: CrowdStrike, Inc., Sunnyvale, CA (US)

(72) Inventors: Theo Chihaia, Bucharest (RO); Jaclyn Abrams, Washington D.C., DC (US); Joel Robert Spurlock, Portland, OR (US); Joseph Faulhaber, Bozeman, MT (US)

(73) Assignee: CrowdStrike, Inc., Sunnyvale, CA (US)

( * ) Notice: Subject to any disclaimer, the term of this patent is extended or adjusted under 35 U.S.C. 154(b) by 206 days.

(21) Appl. No.: 18/203,603

(22) Filed: May 30, 2023

(65) Prior Publication Data

US 2024/0406190 A1    Dec. 5, 2024

(51) Int. Cl.
   *H04L 9/40*      (2022.01)
   *H04L 41/16*     (2022.01)

(52) U.S. Cl.
   CPC .......... *H04L 63/1416* (2013.01); *H04L 41/16* (2013.01); *H04L 63/1433* (2013.01)

(58) Field of Classification Search
   CPC . H04L 63/1416; H04L 63/1433; H04L 63/18; H04L 41/16
   See application file for complete search history.

(56) References Cited

U.S. PATENT DOCUMENTS

| | | | |
|---|---|---|---|
| 5,355,498 | A | 10/1994 | Provino et al. |
| 6,009,274 | A | 12/1999 | Fletcher et al. |
| 6,052,723 | A | 4/2000 | Ginn |
| 6,463,584 | B1 | 10/2002 | Gard et al. |
| 7,093,116 | B2 | 8/2006 | Chen et al. |
| 7,281,268 | B2 | 10/2007 | Hollander et al. |
| 7,366,891 | B2 | 4/2008 | Khanna et al. |
| 7,441,113 | B2 | 10/2008 | Chong et al. |
| 7,448,049 | B1 | 11/2008 | Xing |
| 7,512,810 | B1 | 3/2009 | Ryan |
| 7,571,448 | B1 | 8/2009 | Sallam |

(Continued)

FOREIGN PATENT DOCUMENTS

| | | |
|---|---|---|
| JP | 2003084983 | 3/2003 |
| JP | 2006065835 | 3/2006 |

(Continued)

OTHER PUBLICATIONS

Anonymous, "Connect(2)—Linux manual pages", Feb. 2017, retrieved from the internet: URL:https://web.archive.org/web/20170216051627/ https://man7.org/linux/man-pages/man2/connect.2.html , 4 pages.

(Continued)

*Primary Examiner* — Nam T Tran

(74) *Attorney, Agent, or Firm* — Lee & Hayes, P.C.

(57)      ABSTRACT

Techniques for aggregating data usable for generating security recommendations are discussed herein. A system can aggregate detection data from host devices associated with different organizations based on profile information describing each organization. The system can analyze the aggregated data to identify potential security threats in a data stream, and generate recommendation data usable for defending the data stream from future malicious events.

20 Claims, 6 Drawing Sheets

(56)　　　　References Cited

U.S. PATENT DOCUMENTS

| | | | |
|---|---|---|---|
| 7,890,664 | B1 | 2/2011 | Tao et al. |
| 7,908,656 | B1 | 3/2011 | Mu |
| 8,086,836 | B2 | 12/2011 | Chong et al. |
| 8,190,868 | B2 | 5/2012 | Schneider |
| 8,220,041 | B2 | 7/2012 | Boyce |
| 8,239,947 | B1 | 8/2012 | Glick et al. |
| 8,407,698 | B2 | 3/2013 | Lee |
| 8,413,261 | B2 | 4/2013 | Nemoy et al. |
| 8,429,429 | B1 | 4/2013 | Kargman et al. |
| 8,510,570 | B2 | 8/2013 | Smith et al. |
| 8,533,830 | B1 | 9/2013 | Dalcher |
| 8,539,584 | B2 | 9/2013 | Ramalingam |
| 8,549,648 | B2 | 10/2013 | Sallam |
| 8,572,733 | B1 | 10/2013 | Rockwood |
| 8,578,477 | B1 | 11/2013 | Lin et al. |
| 8,607,340 | B2 | 12/2013 | Wright |
| 8,631,488 | B2 | 1/2014 | Oz et al. |
| 8,776,218 | B2 | 7/2014 | Wright |
| 8,776,227 | B1 | 7/2014 | Glick et al. |
| 8,789,034 | B1 | 7/2014 | Emelyanov et al. |
| 9,038,176 | B2 | 5/2015 | Sallam |
| 9,043,903 | B2 | 5/2015 | Diehl et al. |
| 9,158,914 | B2 | 10/2015 | Ionescu |
| 9,317,687 | B2 | 4/2016 | Edwards et al. |
| 9,571,453 | B2 | 2/2017 | Diehl et al. |
| 9,606,809 | B2 | 3/2017 | Zhang |
| 9,621,515 | B2 | 4/2017 | Diehl et al. |
| 10,002,250 | B2 | 6/2018 | Diehl et al. |
| 10,339,322 | B2 | 7/2019 | Kim et al. |
| 10,476,904 | B2 | 11/2019 | Yamada et al. |
| 10,503,904 | B1 | 12/2019 | Singh et al. |
| 11,757,907 | B1* | 9/2023 | Berger ................ H04L 63/1433 726/23 |
| 12,267,299 | B2* | 4/2025 | Zink ................... H04L 63/1416 |
| 2001/0044904 | A1 | 11/2001 | Berg et al. |
| 2002/0023211 | A1 | 2/2002 | Roth et al. |
| 2003/0112781 | A1 | 6/2003 | Kermode et al. |
| 2004/0107416 | A1 | 6/2004 | Buban et al. |
| 2004/0153724 | A1 | 8/2004 | Nicholson et al. |
| 2004/0255153 | A1 | 12/2004 | Huynh et al. |
| 2005/0097562 | A1 | 5/2005 | Kelley et al. |
| 2005/0159998 | A1 | 7/2005 | Buyukkokten et al. |
| 2005/0268136 | A1 | 12/2005 | Kostadinov et al. |
| 2006/0156380 | A1 | 7/2006 | Gladstone et al. |
| 2007/0143850 | A1 | 6/2007 | Kraemer et al. |
| 2007/0153993 | A1 | 7/2007 | Cohen |
| 2008/0126806 | A1 | 5/2008 | Morten |
| 2008/0162589 | A1 | 7/2008 | Rodeheffer et al. |
| 2008/0301669 | A1 | 12/2008 | Rao et al. |
| 2009/0070878 | A1 | 3/2009 | Wang et al. |
| 2009/0094039 | A1 | 4/2009 | MacDonald et al. |
| 2009/0119681 | A1 | 5/2009 | Bhogal et al. |
| 2009/0288165 | A1 | 11/2009 | Qiu et al. |
| 2009/0307142 | A1 | 12/2009 | Mardikar |
| 2010/0212012 | A1 | 8/2010 | Touboul et al. |
| 2010/0235879 | A1 | 9/2010 | Burnside et al. |
| 2011/0010522 | A1 | 1/2011 | Abts et al. |
| 2011/0167494 | A1 | 7/2011 | Bowen et al. |
| 2012/0079594 | A1 | 3/2012 | Jeong et al. |
| 2012/0084799 | A1 | 4/2012 | Sallam |
| 2012/0255002 | A1 | 10/2012 | Sallam |
| 2013/0145465 | A1 | 6/2013 | Wang et al. |
| 2013/0305340 | A1 | 11/2013 | Wotring |
| 2013/0312095 | A1 | 11/2013 | Edwards et al. |
| 2013/0312099 | A1 | 11/2013 | Edwards et al. |
| 2014/0317405 | A1 | 10/2014 | Johnson et al. |
| 2015/0007316 | A1 | 1/2015 | Ben-Shalom et al. |
| 2015/0007331 | A1 | 1/2015 | Pfeifer, Jr. et al. |
| 2015/0101044 | A1 | 4/2015 | Martin et al. |
| 2015/0128206 | A1 | 5/2015 | Ben Haim et al. |
| 2015/0178071 | A1 | 6/2015 | Pavlik et al. |
| 2015/0244679 | A1 | 8/2015 | Diehl et al. |
| 2015/0256552 | A1 | 9/2015 | Lee et al. |
| 2015/0268947 | A1 | 9/2015 | Ionescu |
| 2015/0326614 | A1 | 11/2015 | Alperovitch et al. |
| 2015/0356301 | A1 | 12/2015 | Diehl et al. |
| 2016/0065598 | A1* | 3/2016 | Modi .................. H04L 63/1416 726/23 |
| 2016/0170740 | A1 | 6/2016 | Ionescu |
| 2016/0226895 | A1* | 8/2016 | Huang ................ H04L 63/1416 |
| 2017/0061127 | A1 | 3/2017 | Ionescu |
| 2017/0109530 | A1 | 4/2017 | Diehl et al. |
| 2017/0213031 | A1 | 7/2017 | Diehl et al. |
| 2017/0279614 | A1 | 9/2017 | Mercury et al. |
| 2018/0239657 | A1 | 8/2018 | Petrbok et al. |
| 2019/0138723 | A1 | 5/2019 | Diehl et al. |
| 2019/0146970 | A1 | 5/2019 | Chamieh et al. |
| 2019/0205533 | A1 | 7/2019 | Diehl et al. |
| 2019/0265968 | A1 | 8/2019 | Ionescu |
| 2020/0026855 | A1 | 1/2020 | Moyal et al. |
| 2020/0028862 | A1* | 1/2020 | Lin ......................... H04L 41/16 |
| 2021/0234884 | A1* | 7/2021 | Brown ............... H04L 63/1416 |
| 2021/0366269 | A1* | 11/2021 | Soppin .................. G08G 1/005 |
| 2022/0287078 | A1 | 9/2022 | Reddy et al. |
| 2023/0107335 | A1* | 4/2023 | Garyani ............. H04L 63/1416 726/23 |
| 2023/0230169 | A1* | 7/2023 | Parient ............... H04L 63/1433 705/4 |
| 2023/0244723 | A1 | 8/2023 | Chihaia |
| 2024/0095350 | A1* | 3/2024 | Withnell ............. H04L 63/1433 |
| 2024/0372876 | A1* | 11/2024 | Shachar ............. H04L 63/1416 |

FOREIGN PATENT DOCUMENTS

| | | |
|---|---|---|
| JP | 2006134307 | 5/2006 |
| JP | 2008047123 | 2/2008 |
| JP | 2008507757 | 3/2008 |
| JP | 2008084304 | 4/2008 |
| JP | 2009015428 | 1/2009 |
| JP | 2009238153 | 10/2009 |
| JP | 2010517164 | 5/2010 |
| JP | 2010182019 | 8/2010 |
| JP | 2013502005 | 1/2013 |
| WO | WO2006023685 | 3/2006 |
| WO | WO2013184281 | 12/2013 |

OTHER PUBLICATIONS

Anonymous, "Socket(2)—Linux manual page", Feb. 2017, retrieved from the internet: URL:https://web.archive.org/web/20170216095427/ http://man7.org/linux/man-pages/man2/socket.2.html , 5 pages.

Australian Office Action mailed Jan. 22, 2018 for Australian Patent Application No. 2013272198, a counterpart foreign application of U.S. Pat. No. 9,043,903, 5 pages.

Australian Office Action mailed Nov. 30, 2017 for Australian patent application No. 2013281175, a counterpart foreign application of U.S. Pat. No. 9,292,881, 4 pages.

Chiueh, et al., "Stealthy Deployment and Execution of In-Guest Kernel Agents", The Black Hat Technical Security Conference USA, 2009, pp #1—pp #12.

European Office Action mailed Jan. 21, 2022 for European Patent Application No. 20172990.2, a foreign counterpart to U.S. Pat. No. 10,289,405, 5 pages.

European Office Action mailed Feb. 18, 2022 for European Patent Application No. 18157955.8, a foreign counterpart to U.S. Pat. No. 10,387,228, 5 pages.

European Office Action mailed on Feb. 19, 2020 for European Patent Application No. 13808592.3, a counterpart of U.S. Pat. No. 9,292,881, 4 pages.

European Office Action mailed on Jun. 29, 2020 for European Patent Application No. 18157955.8, a counterpart foreign application of the U.S. Pat. No. 10,387,228, 10 pages.

European Office Action mailed Nov. 22, 2017 for European patent application No. 13800519.4, a counterpart foreign application of U.S. Pat. No. 9,043,903, 7 pgaes.

European Office Action mailed on Jul. 5, 2019 for European Patent Application No. 13808592.3, a counterpart of U.S. Pat. No. 9,292,881, 5 pages.

European Office Action mailed Aug. 7, 2018, for European patent application No. 13808592.3, a counterpart foreign application of U.S. Pat. No. 9,292,881, 6 pgaes.

(56) References Cited

OTHER PUBLICATIONS

European Office Action mailed Sep. 11, 2017 for European Patent Application No. 16179598.4, a counterpart foreign application of U.S. Appl. No. 14/810,840, 4 pages.
Extended European Search Report mailed Jan. 22, 2018 for European Patent Application No. 15764091.3, 11 pages.
Partial Supplementary European Search Report mailed Jan. 25, 2016 for European Patent Application No. 13808592.3, 6 pages.
Partial Supplementary European Search Report mailed Oct. 12, 2017 for European Patent Application No. 15764091.3, 13 pages.
Supplementary European Search Report mailed Nov. 3, 2015 for European Patent Application No. 13800519.4, 7 pages.
Extended European Search Report mailed Dec. 6, 2016 for European patent application No. 16179598.4, 7 pages.
Supplementary Extended European Search Report mailed Feb. 16, 2016 for European patent application No. 1380051934, 22 pages.
Extended European Search Report mailed Jun. 15, 2018 for European Patent Application No. 18157955.8, 10 pages.
Extended European Search Report mailed Jun. 2, 2016 for European patent application No. 13808592.3, 12 pages.
Partial European Search Report mailed on Apr. 1, 2020 for European Patent Application No. 20150542.7, a counterpart of U.S. Pat. No. 9,043,903, 12 pages.
Extended European Search Report mailed on Jun. 2, 2020 for European Patent Application No. 20172990.2, 8 pages.
Extended European Search Report mailed on Jul. 3, 2020 for European Patent Application No. 20150542.7, 12 pages.
Translated Copy of the Singapore Office Action mailed Sep. 28, 2015 for Singapore patent application No. 11201407292Q, a counterpart foreign application of U.S. Pat. No. 9,043,903, 6 pages.
Graf, "Netlink Library (libni)", retrieved on Jun. 5, 2018 at <<https://www.infradead.org/~tgr/libnl/doc/core.html>>, May 9, 2011, 63 pages.
IDG Communications, "Symantec adds New Protection Features to Its Conusmer and Enterprise Antivirus Solutions", Jan. 19, 2006, 5 pages.

Translated copy of the Israeli Office Action mailed Aug. 30, 2017 for Israeli patent application No. 235905, a counterpart foreign application of U.S. Pat. No. 9,043,903, 5 pages.
Israeli Office Action mailed Sep. 11, 2017 for Israeli patent application No. 236390, a counterpart foreign application of U.S. Pat. No. 9,292,881, 7 pages.
Japanese Office Action mailed on Jan. 8, 2019 for Japanese Patent Application No. 2017-177787, a counterpart of U.S. Pat. No. 9,043,903, 7 pages.
Japanese Office Action mailed on Jan. 29, 2019 for Japanese Patent Application No. 2016-557973, a counterpart of U.S. Appl. No. 14/220,362, 7 pages.
Japanese Office Action mailed Feb. 20, 2018 for Japanese Patent Application No. 2015-520185, a counterpart foreign application of U.S. Pat. No. 9,292,881, 9 pages.
Japanese Office Action mailed Mar. 21. 2017 for Japanese patent application No. 2015-520185, a counterpart foreign application of U.S. Pat. No. 9,292,881, 11 pages.
Japanese Office Action mailed Apr. 25. 2017 for Japanese Patent Application No. 2015-516024, a counterpart foreign application of U.S. Pat. No. 9,043,903, 22 pages.
Kaichuan, "Kernel Korner—Why and How to Use Netlink Socket", retrieved on Jun. 5, 2018 at <<https://www.linuxjournal.com/article/7356>>, Jan. 5, 2015, pp. 1-13.
Messmer, "Are all rootkits evil? Settlement in Sony CD case resurrects old debate.", retrieved on Aug. 11, 18 from https://www.networld.com/article/2312244/Ian-wan/are-all-rootkits-evil.html, May 23, 06, 4 pages.
Neira-Ayuso, et al., "Communicating between the kernel and user-space in Linux using Netlink sockets", Software—Practice and Experience, vol. 40, No. 9, Aug. 1, 2010, Wiley Interscience, pp. 797-810.
PCT Search Report and Written Opinion mailed Jun. 1, 2015 for PCT application No. PCT/US2015/020187, 13 pages.
Singapore Office Action mailed Nov. 17, 2015 for Singapore patent application No. 112014028279Q, a counterpart foreign application of U.S. Appl. No. 13/538,439, 6 pages.

* cited by examiner

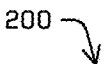

200

```
┌─────────────────────┐           ┌──────────────────────────────────────────┐
│ RECEIVE DETECTION   │           │        COMPUTING DEVICE(S) 108             │
│ DATA ASSOCIATED     │           │  ┌──────────────┐    ┌──────────────┐      │
│ WITH A DATA         │  • • •    │  │ AGGREGATION  │    │   PROFILE    │      │
│ STREAM(S)           │           │  │  COMPONENT   │    │  COMPONENT   │      │
│ 202                 │           │  │     110      │    │     112      │      │
└─────────────────────┘           │  └──────────────┘    └──────────────┘      │
          │                       │         │                    │             │
          ▼                       │         ▼                    ▼             │
┌─────────────────────┐           │  ┌──────────────────────────────────┐      │
│ RECEIVE PROFILE     │           │  │          INPUT DATA              │      │
│ DATA ASSOCIATED     │  • • •    │  │            206                   │      │
│ WITH AN             │           │  └──────────────────────────────────┘      │
│ ORGANIZATION(S)     │           └──────────────────────────────────────────┘
│ 204                 │
└─────────────────────┘
          │
          ▼
┌─────────────────────┐           ┌──────────────────────────────────────────┐
│ DETERMINE A         │           │        GRAPH GENERATOR 114                 │
│ VISUALIZATION TO    │           │  EXAMPLE:                                  │
│ REPRESENT A         │  • • •    │  • ASSOCIATE METADATA WITH THE            │
│ POTENTIAL MALICIOUS │           │    VISUALIZATION                           │
│ EVENT               │           │  • DETERMINE AN ACTOR, TECHNIQUE, OR      │
│ 208                 │           │    MALWARE USED IN A PREVIOUS ATTACK       │
└─────────────────────┘           └──────────────────────────────────────────┘
          │
          ▼
┌─────────────────────┐           ┌──────────────────────────────────────────┐
│ CONFIGURE           │           │     RECOMMENDATION COMPONENT 116           │
│ RECOMMENDATION      │           │  EXAMPLE:                                  │
│ DATA FOR SENDING    │  • • •    │  • IDENTIFY VULNERABILITY IN A DATA       │
│ TO ONE OR MORE      │           │    STREAM(S)                               │
│ ORGANIZATIONS       │           │  • IDENTIFY A POTENTIAL AUTHOR OF A       │
│ 210                 │           │    FUTURE MALICIOUS EVENT                  │
└─────────────────────┘           │  • IDENTIFY POSSIBLE MALWARE FOR A        │
                                  │    FUTURE MALICIOUS EVENT                  │
                                  └──────────────────────────────────────────┘
```

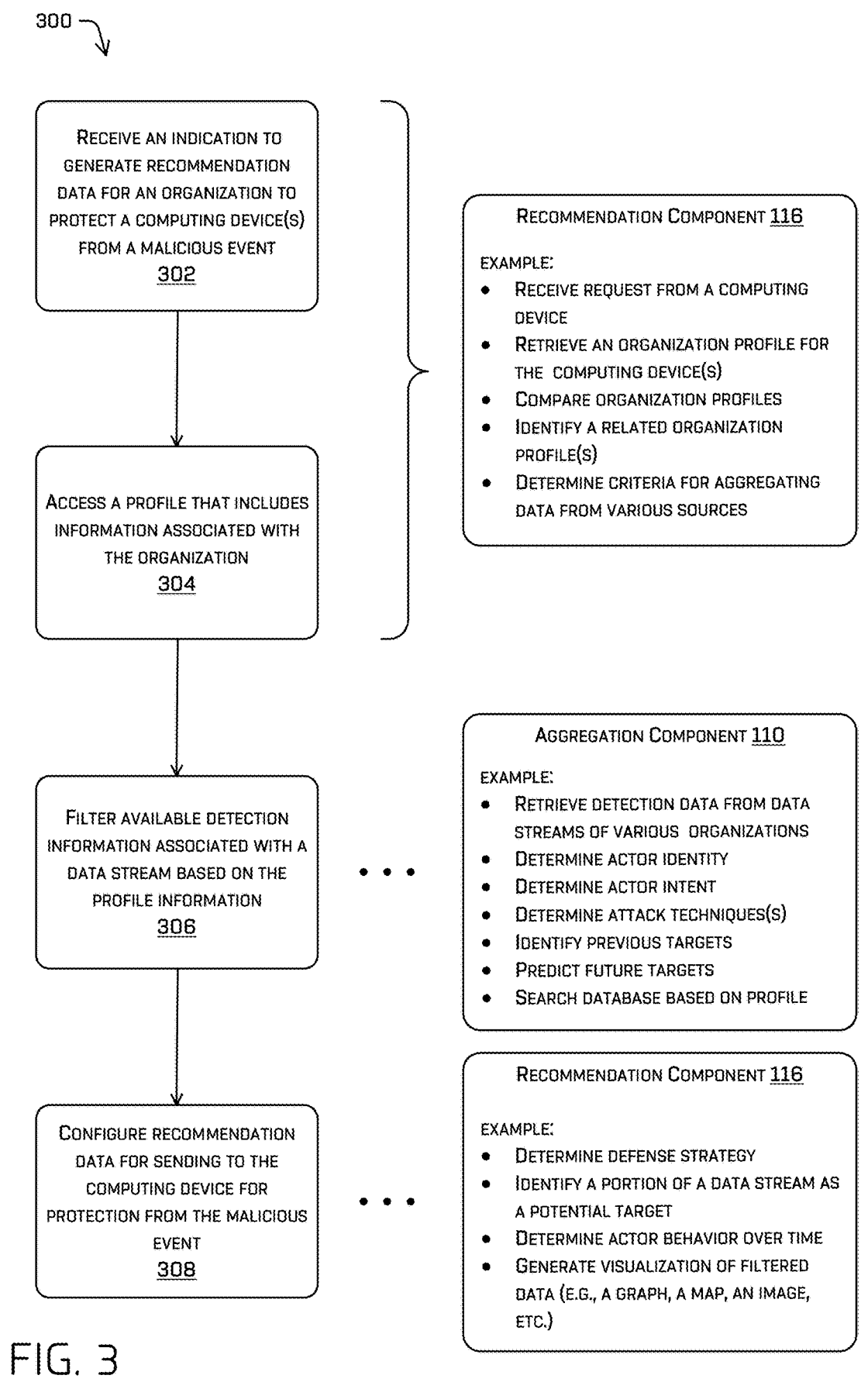

RECEIVE AN INDICATION TO GENERATE RECOMMENDATION DATA FOR AN ORGANIZATION TO PROTECT A COMPUTING DEVICE(S) FROM A MALICIOUS EVENT
302

ACCESS A PROFILE THAT INCLUDES INFORMATION ASSOCIATED WITH THE ORGANIZATION
304

RECOMMENDATION COMPONENT 116

EXAMPLE:
- RECEIVE REQUEST FROM A COMPUTING DEVICE
- RETRIEVE AN ORGANIZATION PROFILE FOR THE COMPUTING DEVICE(S)
- COMPARE ORGANIZATION PROFILES
- IDENTIFY A RELATED ORGANIZATION PROFILE(S)
- DETERMINE CRITERIA FOR AGGREGATING DATA FROM VARIOUS SOURCES

FILTER AVAILABLE DETECTION INFORMATION ASSOCIATED WITH A DATA STREAM BASED ON THE PROFILE INFORMATION
306

• • •

AGGREGATION COMPONENT 110

EXAMPLE:
- RETRIEVE DETECTION DATA FROM DATA STREAMS OF VARIOUS ORGANIZATIONS
- DETERMINE ACTOR IDENTITY
- DETERMINE ACTOR INTENT
- DETERMINE ATTACK TECHNIQUES(S)
- IDENTIFY PREVIOUS TARGETS
- PREDICT FUTURE TARGETS
- SEARCH DATABASE BASED ON PROFILE

CONFIGURE RECOMMENDATION DATA FOR SENDING TO THE COMPUTING DEVICE FOR PROTECTION FROM THE MALICIOUS EVENT
308

• • •

RECOMMENDATION COMPONENT 116

EXAMPLE:
- DETERMINE DEFENSE STRATEGY
- IDENTIFY A PORTION OF A DATA STREAM AS A POTENTIAL TARGET
- DETERMINE ACTOR BEHAVIOR OVER TIME
- GENERATE VISUALIZATION OF FILTERED DATA (E.G., A GRAPH, A MAP, AN IMAGE, ETC.)

FIG. 3

500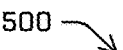

RECEIVE FIRST DATA COMPRISING ONE OR MORE OF: MALICIOUS EVENT INFORMATION, TECHNIQUE INFORMATION, OR ACTOR INFORMATION
502

RECEIVE SECOND DATA COMPRISING A PROFILE OF AN ORGANIZATION
504

INPUT THE FIRST DATA AND THE SECOND DATA INTO A MODEL
506

DETERMINE OUTPUT DATA INCLUDING A VISUALIZATION OF ONE OR MORE OF: A VULNERABILITY, AN ACTOR, OR MALWARE ASSOCIATED WITH A MALICIOUS EVENT
508

DETERMINE THAT THE ORGANIZATION IS ASSOCIATED WITH A RECOMMENDATION SERVICE
510

CONFIGURE RECOMMENDATION DATA FOR OUTPUT BY A COMPUTING DEVICE, THE RECOMMENDATION DATA INCLUDING THE VISUALIZATION AND INFORMATION INDICATING A PORTION OF A DATA STREAM TO PROTECT FROM BEING A TARGET OF A FUTURE MALICIOUS EVENT
512

TRANSMIT THE RECOMMENDATION DATA TO THE COMPUTING DEVICE FOR OUTPUT BY A DISPLAY DEVICE TO PROTECT THE DATA STREAM FROM THE FUTURE MALICIOUS EVENT
514

FIG. 5

THREAT PREDICTION IN A STREAMING SYSTEM

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is malware or is exhibiting malicious behavior can thus be very time-consuming and resource-intensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

sing one or more queries as described herein.

FIG. 2 is a pictorial diagram illustrating an example process to configure recommendation data by one or more example components to protect a data stream and/or a computing device from a malicious event, as described herein.

FIG. 3 is a pictorial diagram illustrating another example process to configure recommendation data by one or more example components to protect a data stream and/or a computing device from a malicious event, as described herein.

FIG. 5 is a flowchart depicting an example process for generating recommendation data usable to protect a data stream from a malicious event.

DETAILED DESCRIPTION

Figure 1:
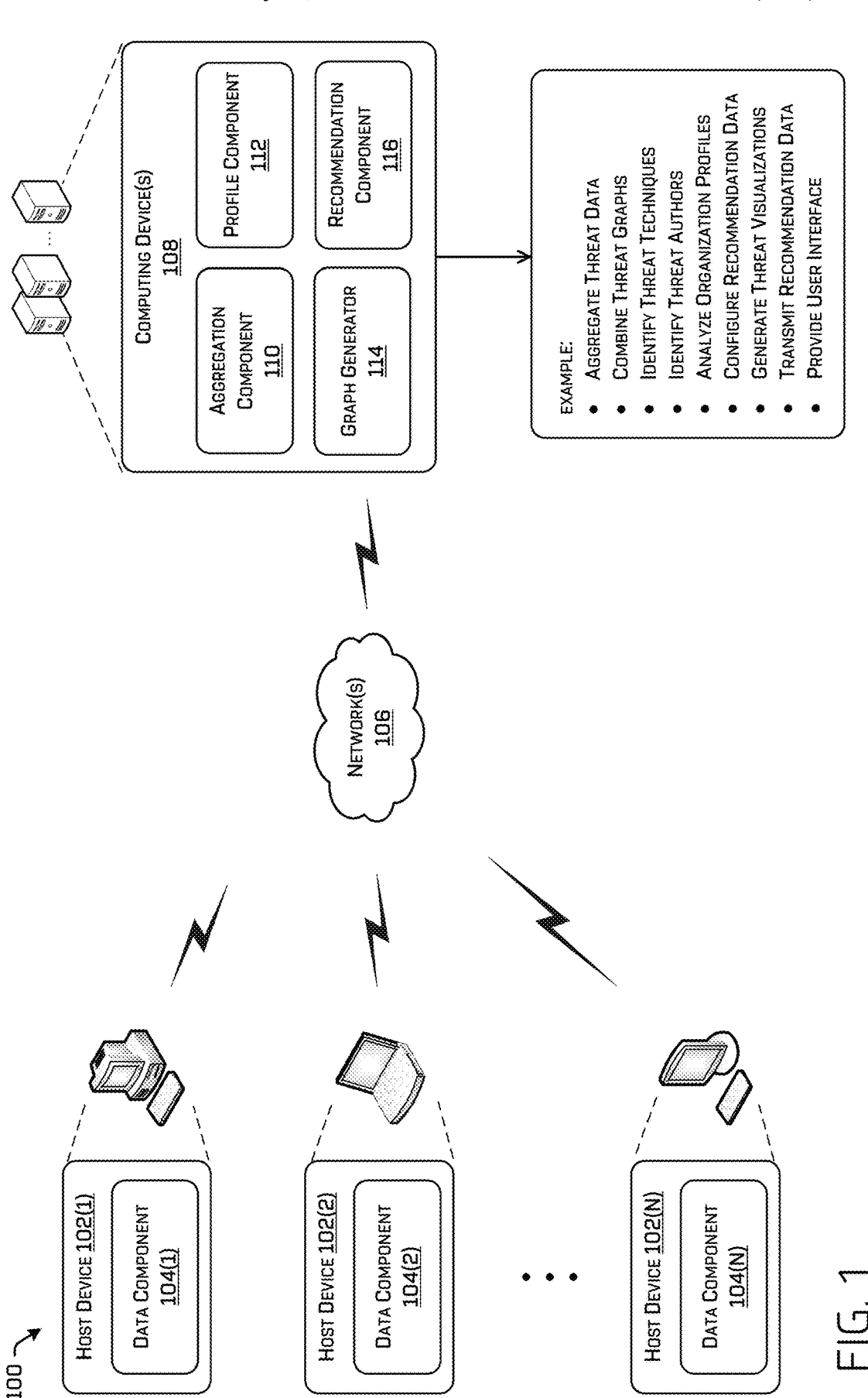
FIG. 1 illustrates an example block diagram of an example computer architecture for providing recommendations to remedy a future malicious event, as described herein.

This application describes techniques for determining recommendation data usable to protect a data stream from potential security threats. The techniques can include a system implementing one or more components to provide recommendations to computing devices associated with a variety of organizations. In various examples, the recommendation can be based on profile information specific for each organization. For example, the system can aggregate data associated with data streams of various devices based on profile information indicating a size, type, or other attributes of the organization(s). The system can analyze the aggregated data to identify potential security threats (e.g., an unauthorized process, thread, executable, or other activity) in the data streams. In various examples, the system can be implemented as a cloud-based service configured to aggregate data from various data streams of similar organization types to determine how and why organizations of a similar size, type, etc. are targeted for malicious events. By implementing the techniques described herein, the system can identify information usable for developing a defense strategy for future malicious events that takes into consideration an author of a previous malicious event, a technique used in a previous malicious event, a reason for the malicious event, and the like.

In various examples, the system can include a profile component to maintain profile information about an organization including a number of employees, geographical location, an organization type, data infrastructure information, and/or subsidiary information, just to name a few. Profiles associated with various organizations can be compared one to another (or to other criteria) to identify computing devices or data streams from which to aggregate data usable for understanding an actor and/or techniques associated with a previous malicious event. Additional detail for the system and the components thereof can be found throughout this disclosure including in figures that follow. By using profiles in a variety of ways as discussed herein, the system can identify, filter, aggregate, or otherwise determine data stream data (e.g., events or other activity) for generation of recommendation data that secures the data stream from a future malicious event.

The system can, for example, comprise one or more computing devices (e.g., a server, a data center, etc.) that manage profiles, aggregate data, and/or generate recommendation data remote from one or more host devices (other computing devices) being monitored. In such examples, a computing device can receive a copy of data stream data associated with the one or more host devices (e.g., directed to the system by a host device). The data stream data can include results of queries that identify a variety of different activity associated with the data stream including, for example, identifying data written to a windows registry, a file system, or a document: or identifying activity associated with an open network socket or a Domain Name System (DNS) look-up, among others. More generally, the activity can represent a process, a thread, code, bytes, a data packet, or an instruction accessing or requesting access to a particular portion of a host device. The system can, for instance, analyze query results and recommend a query, a software update, or other change to remedy a future malicious event. However, in other examples, the host devices can include a component that is configured to perform at least some of the functionality associated with the computing device of the system.

By way of example and not limitation, the system can aggregate data associated with a previous query initiated by the host device. The query can include query criteria indicating information to "look for" when the query is executed by a processor of the host device. For example, the query criteria associated with the query can be updated to add new functionality, fix a bug, or otherwise improve accuracy of results by the query (or determination therefrom). The query criteria can, in various examples, be determined by a user associated with the host device, a user associated with the system, and/or a model (e.g., a heuristic model, a statistical model, a machine learned model, or the like) of the system or the host device. Thus, the aggregated data can include a variety of information associated with one or more queries.

In various examples, a query can detect different types of incidents associated with one or more events that occurred, or are occurring, on the host device over time. The incident may indicate that the monitored host device may or may not have been "compromised" by malicious behavior (e.g., adversarial activity, malware, etc.) based on the information gathered from the detected events. In some examples, the system may aggregate data for events performed by one or more programs on a monitored host device. As described herein, the data may be analyzed by a same or different system to detect patterns in the events representing a variety of potential security threats.

In some examples, the system can implement a graph generator to represent aggregated data as a visualization (e.g., a graph, map, image, or the like). The graph generator can receive a variety of input data (e.g., a threat graph indicating previous attempts to compromise the data stream, query results, profile data, etc.) for determining a representation of previous malicious events. The visualization can be defined based on data aggregated from two or more organizations having a similar size, function, data infrastructure, location (e.g., country, geographic location), or the like. In some examples, the visualization can be configured for output to a human or model responsible for determining a defense strategy for the host devices.

In some examples, the system can implement a user interface to exchange data with the host devices receiving the recommendation data. The user interface can, for example, enable a user of the host device to send a request for information to better understand how to protect the host device and data streams associated therewith. The user interface can also or instead be configured to receive data from the system for output on a display device. The user interface can include selectable controls to configure reports, identify likely actors, attack techniques, etc. for developing a cloud-based security strategy. In various examples, the host device can receive recommendation data as a service and independent of sending a request for such data.

In various examples, the system can receive, as input data, a portion of the data stream from a storage device (or receive the portion in real-time independent of the database), such as a data stream database that receives (and in some instances replicates) all data associated with the data stream. The system can, for instance, identify the data stream from which to access the data stream data based at least in part on the profile information. By using the techniques described herein, data usable for protecting the host device and/or the data stream can be identified in less time and with more accuracy (e.g., versus relying on a human to analyze and convey the analyzed data to a user of the host device).

In some examples, the user interface is configured to receive an input indicating a request for data, review recommendation data, and/or provide profile information (e.g., details about the organization associated with the host device). In some examples, functionality provided by the system can be implemented responsive to an input received via the user interface (e.g., a request for data associated with previous malicious activity). In various examples, the recommendation data can based on data aggregated from multiple "like" organizations (e.g., organizations having a score indicating a similarity). The system can, for example, configure the recommendation data for presentation as a visualization in the user interface to convey an author, technique, location, time, purpose, and/or remedy for future malicious activity on the host device.

The techniques described herein can improve functioning of a computing device by providing a robust and efficient method for predicting characteristics of a future malicious event in a data stream associated with a computing device. For example, the computing device can determine which activity in a data stream to retrieve as input to one or more components to save computational resources (e.g., a memory, a processor, and the like) used to generate a recommendation. That is, by processing a subset of the available data, the system can generate an accurate recommendation in less time versus not implementing the system. Further, performing the techniques by the system can improve a computer network by reducing an amount of data transmitted over the computer network to generate and/or transmit recommendation data.

Although in some examples the system comprises a computing device monitoring a host device, in other examples, the system may enable the techniques described herein to be performed by the host device independent of the computing device and/or independent of a network connection. That is, either the host device and/or the computing device may implement one or more components to aggregate, analyze, and generate security information usable to prevent a possible malicious event in the future.

In various instances, a computing device may install, and subsequently execute a security agent as part of a security service system to monitor and record events and/or patterns on a plurality of computing devices in an effort to detect, prevent, and mitigate damage from malware or malicious attack. In various examples, the security agent may detect, record, and/or analyze events on the computing device, and the security agent can send those recorded events (or data associated with the events) to a security system implemented in the "Cloud" (the "security system" also being referred to herein as a "security service system," a "remote security service," or a "security service cloud"). At the security system, the received events data can be further analyzed for purposes of detecting, preventing, and/or defeating malware and attacks. The security agent can, for instance, reside on the host device, observe and analyze events that occur on the host device, and interacts with a security system to enable a detection loop that is aimed at defeating all aspects of a possible attack.

Some examples herein relate to detecting malware or malicious behavior by, for example, recording events performed by a processor executing one or more programs and analyzing distributions of the events by event type (e.g., a type of process, a type of thread, or lateral movement between host devices). For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

As used herein, the term "adversaries" includes, e.g., malware developers, exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing event stream(s) or sequence(s) indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events, permitting malware detection without requiring disassembly or other inspection of the code for that malware. Of course, the techniques can also be used to detect single, non-repetitive, instances that may occur in the data steam.

The techniques described herein may be implemented in a number of ways. Example implementations are provided below with reference to the following figures. Although discussed in the context of a security system, the methods, apparatuses, techniques, and systems, described herein can be applied to a variety of systems (e.g., data storage systems, service hosting systems, cloud systems, and the like), and are not limited to security systems.

FIG. 1 illustrates an example block diagram 100 of an example computer architecture for providing recommendations to remedy a future malicious event, as described herein. The diagram 100 may include one or more host device(s) 102(1), 102(2), . . . , 102(N) (individually and/or collectively referred to herein with reference 102), where N is any integer greater than or equal to 1, that interact with the computing device(s) 108 of a service system over network(s) 106. In various examples, the service system may be part of or associated with a cloud-based service network that is configured to implement aspects of the functionality described herein.

In some embodiments, the network(s) 106 may include any one or more networks, such as wired networks, wireless networks, and combinations of wired and wireless networks. Further, the network(s) 106 may include any one or combination of multiple different types of public or private networks (e.g., cable networks, the Internet, wireless networks, etc.). In some instances, the host device 102 and the computing device(s) 108 communicate over the network(s) 106 using a secure protocol (e.g., https) and/or any other protocol or set of protocols, such as the transmission control protocol/Internet protocol (TCP/IP).

The host device 102 (sometimes called "host computing device," "host machine," or "monitored computing device") may implement one or more data components 104(1), 104(2), . . . , 104(N) (individually and/or collectively referred to herein with reference 104, where N is any integer greater than or equal to 1), which is stored in memory of the host device 102 and executable by one or more processors of the host device 102. The host devices 102 may be or include any suitable type of host devices 102, including, without limitation, a mainframe, a work station, a personal computer (PC), a laptop computer, a tablet computer, a personal digital assistant (PDA), a cellular phone, a media center, an embedded system, a robotic device, a vehicle, a Machine to Machine device (M2M), an unmanned aerial vehicle (UAV), an Internet of Things (IoT), or any other type of device or devices capable of communicating via an instance of the data component 104. An entity may be associated with the host devices 102, and the entity (user, computing device, organization, or the like) may have registered for query and/or security services provided by a service provider of the computing device(s) 108.

The data component 104 can represent software, firmware, hardware, or a combination thereof, that is configured to exchange data with the computing device(s) 108, and the components thereof. In some examples, the data component 104 can be configured to send or receive data associated with a query (or other data for aggregation) to and/or from the computing device(s) 108. The data component 104 can cause a portion of the data stream data to be sent to the computing device(s) 108. In some examples, the data component 104 can cause a query to execute on the data stream at the host device 102.

In some examples, the computing device(s) 108 can execute queries as described herein independent of the host device 102 including the data component 104. In other words, the host device(s) 102 need not include the data component 104 for the computing device(s) 108 to implement the techniques described herein.

The data component 104 may provide functionality for the host device 102 to interface with the computing device (s) 108 sufficient to manage a profile, request security recommendations, manage a query, and/or receive recommendation data as described herein (e.g., establish a branch of the data stream for sending to the computing device(s) 108).

The data component 104 may, in some examples, be kernel-level security agents, or similar security application or interface to implement at least some of the techniques described herein. Such kernel-level security agents may each include activity pattern consumers that receive notifications of events in a query that meet query criteria. The kernel-level security agents may each be installed by and configurable by computing device(s) 108, receiving, and applying while live, reconfigurations of agent module(s) and/or an agent situational model. Further, the kernel-level security agents may each output query results to the computing device(s) 108 that include the security-relevant information determined by the data component 104. The data component 104 may continue to execute on the host device 102 by observing and sending detected activity to the computing device(s) 108 while the host device 102 is powered on and running.

In some embodiments, the data component 104 may be connected to the computing device(s) 108 via a secure channel, such as a virtual private network (VPN) tunnel or other sort of secure channel and may provide query results security-relevant information to the computing device(s) 108 through the secure channel. The data component 104 may also receive configuration updates, instructions, remediation, etc. from the computing device(s) 108 via the secure channel.

The host device 102 may receive the data component 104 over the network(s) 106 from the computing device(s) 108 by downloading the data component 104 as a software package to be installed on the host devices 102. Together, the data component 104 of the host devices 102 and the computing device(s) 108 form a detection loop, which can be enabled by an agent architecture designed in accordance with the principles of the well-known OODA-loop (i.e., observe-orient-detect-act-loop). The data component 104 may include components that receive and/or send notifications of semantically-interesting query results (e.g., file writes and launching executables) from host operating system hooks or filter drivers, from user-mode activity pattern monitors, or from threads monitoring log files or memory locations. Thus, the data component 104 may observe query results (e.g., activity patterns over time), determine actions to take based on those query results, and/or send the query results to the computing device(s) 108 for further analysis.

The detected activity observed by the data component 104 (e.g., query results, and the like) may be sent over the network(s) 106 to the computing device(s) 108, with or without further processing by the data component 104. For example, in some embodiments, the detected activity observed by the data component 104 may be filtered using first configurable filters of the data component 104 to remove known safe activity patterns to help reduce size of data transfer and then sent to the computing device(s) 108. Alternatively, the detected activity can be sent to the computing device(s) 108 without further filtering on the host devices 102.

The data component 104 of the host device 102 may trigger varying levels of containment for the host device 102 based on varying levels suspicious events in an input data stream. In response to determining that the host device 102 is compromised (e.g., an incident is found in the event results), the computing device(s) 108 can send a containment instruction over the network 106 to the host device 102. Upon receipt of this containment instruction, the data component 104 may cause the host device 102 to enable (activate, trigger, etc.) network containment.

To enable network containment on the host device 102, the data component 104 can implement a firewall policy included with the data component 104. Upon enforcement of the firewall policy, a firewall of the host device 102 denies outgoing data packets from, and incoming data packets to, the host device 102 that would have been allowed prior to the implementing of the firewall policy. In some embodiments, the firewall policy, may deny all traffic to and from the host device 102 with respect to other computing systems having remote network addresses (e.g., Internet Protocol (IP) addresses) that are not otherwise specified in the firewall policy as an exception for allowed traffic. In various embodiments, however, network containment can be implemented on the host device 102 in a manner that allows some communication to/from the host device 102 with a network other than the network 106. For example, the firewall policy can specify exceptions for remote network addresses (e.g., third-parties) that are allowed to communicate with the host device 102 after containment is enabled/initiated and while the host device 102 remains contained. The firewall policy may allow some traffic to and from the computing device(s) 108 so that a communication channel remains open and usable between the host device 102 and the computing device(s) 108, even when the host device 102 is "contained" (or cutoff from communicating with the other host device(s) 102 besides the computing device(s) 108). To accomplish this result, the firewall policy can specify at least one remote network address (e.g., a remote IP address) associated with the computing device(s) 108, and may specify an action to allow outgoing data packets to, and incoming data packets from, the computing device(s) 108, which may be associated with the at least one remote network address that can be specified in the firewall policy. In some embodiments, the containment instructions may specify an action to block a specific suspicious activity pattern rather than trigger network containment if the suspicious activity pattern is limited in action.

In various examples, the computing device(s) 108 may include functionality to collect and analyze the observed query results (or observed incidents therein) received from host device(s) 102, to preemptively identify a defense for suspicious activity, and to mitigate any malware or malicious code found in the host device(s) 102.

As shown in FIG. 1, the computing device(s) 108 may include an aggregation component 110, a profile component 112, a graph generator 114, and a recommendation component 116 to perform the functionality described herein.

In various examples, the aggregation component 110 may aggregate information usable to define recommendation data. In various examples, the aggregation component 110 may gather data (e.g., detection data, query data, organization profile data, and/or actor profile data, etc.) from various sources for processing by one or more models or components associated with the service system. The aggregation component 110 can, for example, retrieve data from a data stream, a database, a host device, a memory, and/or a storage device associated with the service system.

In some examples, the aggregation component 110 can aggregate, identify, retrieve, access, or otherwise determine threat data (e.g., data identifying a previous threat such as a query result, a previous malicious event, representations of a malicious event, and the like). By way of example and not limitation, the threat data can include a threat graph to represent one or more threats (e.g., unauthorize access, malware, etc.) to a respective host device at a previous time, as discussed further herein. Additional details of determining visualizations are described in U.S. patent application Ser. No. 16/943,033, filed on Jul. 30, 2020, entitled "Mapping Unbounded Incident Scores to Fix a Range," in U.S. patent application Ser. No. 16/943,949, filed on Jul. 30, 2020, entitled "Malicious Incident Visualization," and in U.S. patent application Ser. No. 16/943,755, filed on Jul. 30, 2020, entitled "Visualization and Control of Remotely Monitored Hosts," which are incorporated herein by reference in their entirety and for all purposes.

The threat data can also or instead include actor information identifying a source of a previous malicious event(s) and/or technique information identifying one or more techniques associated with the previous malicious event(s) in a data stream associated with the host device(s) 102. For example, the aggregation component 110 can receive actor information (e.g., a name, an identifier, motivation information, previous behavior, and/or a location of previous activity by an actor, just to name a few) from a third-party and/or from a database maintained by the service system. In some examples, the aggregation component 110 can receive technique information (e.g., a place, time, intrusion type, preferences by actor, etc.) from a third-party and/or from a database maintained by the service system.

In some examples, the aggregation component 110 may receive profile data comprising profiles for different organizations in which an example profile includes one or more of: a location of the computing devices operated by the organization, a geographic location(s) of the organization (e.g., country, geographic region, etc.), a size of the organization (e.g., a number of employees), an organization type (e.g., a description of the service provided by the organization), data infrastructure information (e.g., a number of computing devices, type of software, hardware, etc. used by each computing device, computer architecture, etc.), or subsidiary information (e.g., a business related or owned by the organization).

The aggregation component 110 may also or instead receive profile data representing an actor profile that identifies details of the actor such as the aforementioned actor information, technique information, etc. Thus, the profile data can include an organization profile and/or an actor profile, as further discusses herein including in relation to the profile component 112.

In some examples, the aggregation component 110 may receive query results associated with events from the host device(s) 102 and aggregate the query results for analysis by a component of the computing device(s) 108 and/or the host device 102. The query results can be aggregated based at least in part on the profile data (e.g., data can be collected from specific organizations). In some examples, a storage device (not shown) can store communication and security information associated with the host device(s) 102, observed activity patterns in a data stream received from the data component(s) 104 on the host device(s) 102, and the like. In various examples, a database, memory, or other storage device can store the query results and/or receive a dynamically changing data stream to have data available for determining recommendations, or for other reasons.

The profile component 112 represents functionality to initiate, update, or otherwise manage profiles associated with an organization, an actor of a previous malicious event, a visualization, and/or recommendation. For example, the profile component 112 can generate, store, send, or otherwise manage profile data which can comprise one or more of: organization profile information, actor information, technique information, or recommendation information, among others. The recommendation profile can include current and previous recommendations for analysis to generate a recommendation pattern over time which may be used to improve how to predict a future malicious event and/or to determine useful recommendation data for a particular time.

The service system can implement the graph generator 114 to generate a visualization (e.g., a graph, a map, an image, a diagram, or an animation) that visually conveys threat information associated with a previous time. The graph generator 114 can, for example, generate the visualization periodically based on a request for recommendation data from the host device(s) 102 or expiration of a time period (e.g., to send recommendations at intervals or in response to a malicious event as part of a security service). In some examples, the visualization can indicate one or more of: a vulnerability exposed during a previous malicious event, an actor that initiated the previous malicious event, or malware executed in association with the previous malicious event, just to name a few.

The graph generator 114 can generate a variety of different visualizations, or graphs, at different times including generating graphs for representing data stream activity for an organization. In some examples, a graph can be generated based on aggregated data from two or more alike organizations whereas in other examples the graph can be generated based on aggregated data from a single organization.

The recommendation component 116 represents functionality to generate recommendation data for sending to the host device(s) 102. The recommendation data can, for example, indicate a portion of host device(s) 102 or data stream associated with therewith that is most likely to be targeted in a future malicious event, an actor most likely to cause malicious behavior on the host device, techniques likely to be used, etc. In various examples, the recommendation data can include the visualization for output by a display device of the host device(s) 102.

In some examples, a user (e.g., an analyst) and/or a model associated with the computing device(s) 108 can provide input to the recommendation component 116 to verify accuracy of the recommendation data and/or to update the recommendation data prior to transmission. For instance, the user can suggest that a different number of organizations be considered during generation of the recommendation data including considering organizations within a threshold similarity (which the user may also vary to generate different recommendation data).

By way of example and not limitation, the recommendation component 116 can receive profile data from the profile component 112 which includes two or more organization profiles. The recommendation component 116 can compare information in the organization profiles, one to another, to identify which organizations have similar characteristics, such as a same number of employees, a same type (e.g., finance, government, technology, advertising, etc.), and so on. The recommendation component 116 can generate an instruction for sending to the aggregation component 110 indicating from which organizations to retrieve data associated with previous detections (hence, also referred to as detection data). Accordingly, the aggregation component 110 can send the aggregated data to the recommendation component 116 for further consideration in determining a recommendation.

The recommendation component 116 can, for example, receive data from the graph generator 114 representing one or more visualizations. For instance, the recommendation component 116 can generate an instruction for sending to the graph generator 114 indicating a request to generate a graph that visually summarizes previous malicious activity over time. In such examples, the graph generator 114 can generate the one or more visualizations based at least in part on the aggregated data associated with the two or more organizations. However, in other examples the recommendation component 116 can receive the data independent of generating the instruction or otherwise requesting the data.

As mentioned, the graph generator 114 can generate graphs periodically for each organization to convey potential threats to a data stream. In some examples, the recommendation component 116 can receive threat graphs (that have already been generated independent of a request from the recommendation component 116) in response to determining that the host device(s) 102 is associated with a recommendation service (as indicated in the organization profile). Further, the recommendation component 116 can, based at least in part on the organization being associated with the recommendation service, configure recommendation data for transmitting to the host device(s) 102. In some examples, the recommendation data includes the visualization and information indicating a portion of the data stream to protect from being a target of a future malicious event, a likely actor, attack techniques to expect, and so on.

In various examples, the graph generator 114 can, for example, combine the threat graphs (or information therein), and the combined graph can represent the visualization. For example, threat graphs associated with different organizations can represent instances of previous malicious activity, and the combined graph can combine findings from the different organizations to provide a greater level of understanding which can lead to improved recommendations.

The recommendation component 116 can implement a model that is configured to receive profile data and aggregated data as input, and output recommendation data that includes the visualization and information indicating a portion of the data stream to protect from being a target of a future malicious event. For example, the recommendation component 116 can determine metadata describing the visualization such as one or more of: a location of the malicious event (e.g., a portion of the data stream or host device having experienced a previous attack), an average size of the organizations from which data was used to generate the visualization, the organization type, a human-readable name of the visualization, a creation time of the visualization, one or more profiles used to generate the visualization, etc. The recommendation component 116 can, in some examples, associate the metadata and the visualization as a visualization profile for storing in a database. In some examples, the profile data used as input can include an actor profile, and/or a visualization profile.

The model implemented by the recommendation component 116 can also be configured to receive detection data as noted elsewhere herein. For example, the detection data can include one or more of: first malicious event information in a first data stream associated with a first computing device of a first organization, second malicious event information in a second data stream associated with a second computing device of a second organization, technique information identifying one or more techniques associated with a malicious event in the first data stream or the second data stream, and/or author information identifying one or more authors associated with the malicious event (e.g., a malicious process or thread in the first data stream or the second data stream). The malicious event information can include computer-readable data, human-readable data, a graph such as a threat graph, or other information.

To proactively provide recommendations, the recommendation component 116 can, generate recommendation data for sending to another host device in an additional organization that is similar to an organization for which recommendations have already been generated. For example, the recommendation component 116 can compare metadata of a stored visualization profile with information in various organization profiles to identify organizations for sending the visualization (or a modified version thereof) as recommendation data. The recommendation data may include, for example, a recommendation to change a policy, setting, or computer-readable instruction in the host device(s) 102.

In various examples, the recommendation component 116 can assign a weight to different attributes in a profile, and compare the weights to determine a value indicative of a similarity score. For instance, attributes such as an organization type or size may be weighted higher than another attribute such as a location of the organization. In the case of the profile being an actor profile, a motivation (e.g., a list of values representing different motivations) for a previous attack may be weighted higher than, for example, a location of the previous attack. In some examples, the recommendation component 116 can compare the value to a threshold value such that values within a range of the threshold value can be considered sufficiently alike for providing the recommendation information.

In some examples, the recommendation component 116 can compare information of different organization profiles one to another and output a value (e.g., a score) indicative of similarity between a first organization and the second organization. For example, information in various organization profiles can be analyzed by the recommendation component 116 to identify similarities and/or differences among the organization profiles. The value can be used in a variety of ways including, for example, the aggregation component 110 using the value to identify organizations by type, size, or within a threshold geographical range from which to aggregate data usable to generate the recommendations described herein. The value may also or instead be used to identify graphs or other detection data from different organizations such as threat graphs are as generally associated with a single organization whereas the visualization output by the graph generator 114 (or recommendation component 116) represents information that is combined based on the profile data (e.g., the comparison of information of an organization profile to information in another organization profile). The recommendation data transmitted to a particular organization can vary by a size, a type, a desired security level, a physical location of each computing device in the organization, a region or country associated with the organization, data infrastructure information describing the systems, and hardware implemented by the organization in association one or more data streams, just to name a few.

In some instances, a training component (not shown) may be executed by one or more processor(s) of a computing device to train a machine learning model based on training data. The training data may include a wide variety of data, such as computer behavior data, query result data, historical data, visualizations of a security threat, or a combination thereof, that is associated with a value (e.g., a classification of interest, inference, prediction, etc.). Such values may generally be referred to as a "ground truth." To illustrate, the training data may be used for determining presence of a potential security impact to operation of a computing device in a data stream and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

Though depicted in FIG. 1 as separate components of the computing device(s) 108, functionality associated with the aggregation component 110, the profile component 112, the graph generator 114, and/or the recommendation component 116 can be included in a different component of the service system or be included in the host device(s) 102. In some instances, the components described herein may comprise a pluggable component, such as a virtual machine, a container, a serverless function, etc., that is capable of being implemented in a service provider and/or in conjunction with any Application Program Interface (API) gateway.

FIG. 2 is a pictorial diagram illustrating an example process 200 to configure recommendation data by one or more example components to protect a data stream and/or a computing device from a malicious event, as described herein. The example process 200 may be implemented by a computing device such as the computing device(s) 108 of FIG. 1. The computing device(s) 108 can implement the aggregation component 110, the profile component 112, the graph generator 114, and/or the recommendation component 116 to generate recommendation data for sending to a computing device (e.g., the host device(s) 102) to cause the computing device to implement security protocols in a dynamic data stream (e.g., a data stream that changes over time).

An operation 202 can include receiving detection data associated with a data stream(s). In some examples, the aggregation component 110 can receive an instruction from the recommendation component 116 identifying one or more organizations from which to aggregate detection information. The detection information can represent, for example, previous activity in a respective data stream such as query results associated with one or more queries. In some examples, the recommendation component 116 can generate the instruction based at least in part on receiving a message from a host device requesting security analysis of the data stream(s). For example, a first organization can request recommendation data and the recommendation component 116 can initiate data aggregation based on receiving the message.

An operation 204 can include receiving profile data associated with an organization(s). For example, the operation 204 can include the computing device(s) 108 receiving profile data from the profile component 112 including one or more of: an organizational profile, a visualization profile, or an actor profile. In some examples, the profile component 112 can provide the profile data to enable the recommendation component 116 to analyze multiple organizational profiles. For example, one or more additional organizations similar to the first organization can be identified based on a value assigned to each organization representing a similarity to another organization. Organizations having a value within a predetermined threshold can be targeted by the aggregation component 110 for aggregating data. In various examples, a model or human associated with the computing device(s) 108 can modify the predetermined threshold to increase or decrease a number of organizations contributing detection information as input data 206.

The input data 206 represents a combination of the detection data from the aggregation component 110 and the profile data from the profile component 112 that is usable by a component or model to generate a visualization that represent a likelihood potential malicious event. In some examples, the aggregation component 110 can access data stream data from the data stream (or a database that replicated all previous activity in the data stream for a period of time) based at least in part on the profile data. Generally, the input data 206 can represent data associated with a security service which can include results of previous queries ran on a host device and/or data associated with a data stream into the host device. The input data 206 can change over time as the host device receives new data into the data stream for processing. In some examples, the input data 206 can represent telemetry information received from one or more host devices in an environment remote from an environment associated with the computing device(s) 108 implementing the aggregation component 110.

In various examples, the input data 206 can include data associated with a third-party entity. For example, information, criteria, or other data associated with an actor, technique, and/or actor behavior (e.g., motivation, likely targets, behavior patterns, etc.) can be received from a third-party that is authorized to provide the data to implement the techniques described herein.

An operation 208 can include determining a visualization to represent a potential malicious event. For example, the operation 208 can include the graph generator 114 receiving the input data 206 and generating the visualization and also generating metadata describing features of the visualization. In some examples, the graph generator 114 can receive various graphs representing detections of previous malicious events and output a graph which collectively represents each of the various graphs. In this way the visualization can be thought of as an intelligence graph derived from two or more threat graphs in which each threat graphs comes from a related organization. The visualization can, for example, convey an actor, a technique, and/or malware used in a previous attack as well as a location of the attack within the data infrastructure. The visualization can be based on the accessing and incorporating information from an actor profile that aims to understand a purpose or intent behind an attack to better predict future attacks.

An operation 210 can include configuring recommendation data for sending to one or more organizations. For example, the operation 210 can include the recommendation component 116 generating recommendation data that includes the visualization and the metadata output by the graph generator 114. The recommendation data can identify a vulnerability in a data stream(s) such as a likely portion of the data stream and/or host device for an actor to target with a specific technique. The recommendation data can also or instead identify a potential actor and/or possible malware associated with a future malicious event. Using the techniques described herein, recommendation data can be tailored to an organization by deriving additional detection information from other organizations independent of the organization being aware that the recommendation data is configured based on the other organizations.

FIG. 3 is a pictorial diagram illustrating an example process 300 to configure recommendation data by one or more example components to protect a data stream and/or a computing device from a malicious event, as described herein. The example process 300 may be implemented by a computing device such as the computing device(s) 108 of FIG. 1. The computing device(s) 108 can implement the aggregation component 110, the profile component 112, the graph generator 114, and/or the recommendation component 116 to generate recommendation data for sending to a computing device (e.g., the host device(s) 102).

An operation 302 can include receiving an indication to generate recommendation data for an organization to protect the computing device(s) from a malicious event. For example, the recommendation component 116 can initiate generating recommendation data based at least in part on an expiration of a time period and/or a message requesting such a recommendation (e.g., from a host).

An operation 304 can include accessing a profile that includes information associated with the organization. For example, the recommendation component 116 can retrieve profile data including an organizational profile associated with the computing device(s). In some examples, the operation 304 can include accessing multiple organization profiles and identifying at least one additional similar organization usable for generating the recommendation data. For instance, an identifier associated with the organization can be used to access a profile of an organization, and based on the information in the profile, a score associated with the profile, or the like, identify additional similar organizations.

An operation 306 can include filtering available detection information associated with the data stream based on the profile information. For example, the aggregation component 110 can aggregate detection data from data streams of various organizations based at least in part on the profile information. The detection information associated with the data stream can include the query results representing events (or incidents) gathered or detected during a time period.

Generally, the aggregation component 110 can use the profile information to collect a subset of a corpus of available data stream data. In various examples, the operation 306 can include the recommendation component 116 determining an actor identity, an actor intent, an attack technique, a previous target, and/or a future target, just to name a few. For instance, the recommendation component 116 can receive the detection data and/or the profile data from one or more databases.

An operation 308 can include configuring recommendation data for sending to the computing device for protection from the malicious event. For example, the recommendation component 116 can generate information for transmitting to the host device(s) 102 that identifies a portion of the data stream as a potential target, identifies actor behavior likely to occur in the future, a likely geographical location for a malicious event, and so on. In some examples, the recommendation component 116 can determine the recommendation data based at least in part on the profile data and the detection data.

In various examples, the recommendation component 116 can access, generate, or determine a similarity score for two organizations, and computing devices thereof (e.g., a first similarity score for a host device of a first organization relative to another host device of a second organization). In some examples, the similarity scores can be defined by a user, machine learned model, heuristic model, or the like with consideration to how computing devices and organizations are associated with different levels of data and data sensitivity. The similarity scores can, for example, be used to identify organizations from which to filter data. Similarity scores can also or instead indicate a relative importance of one environment or computing device relative to another environment or another computing device.

Figure 4:
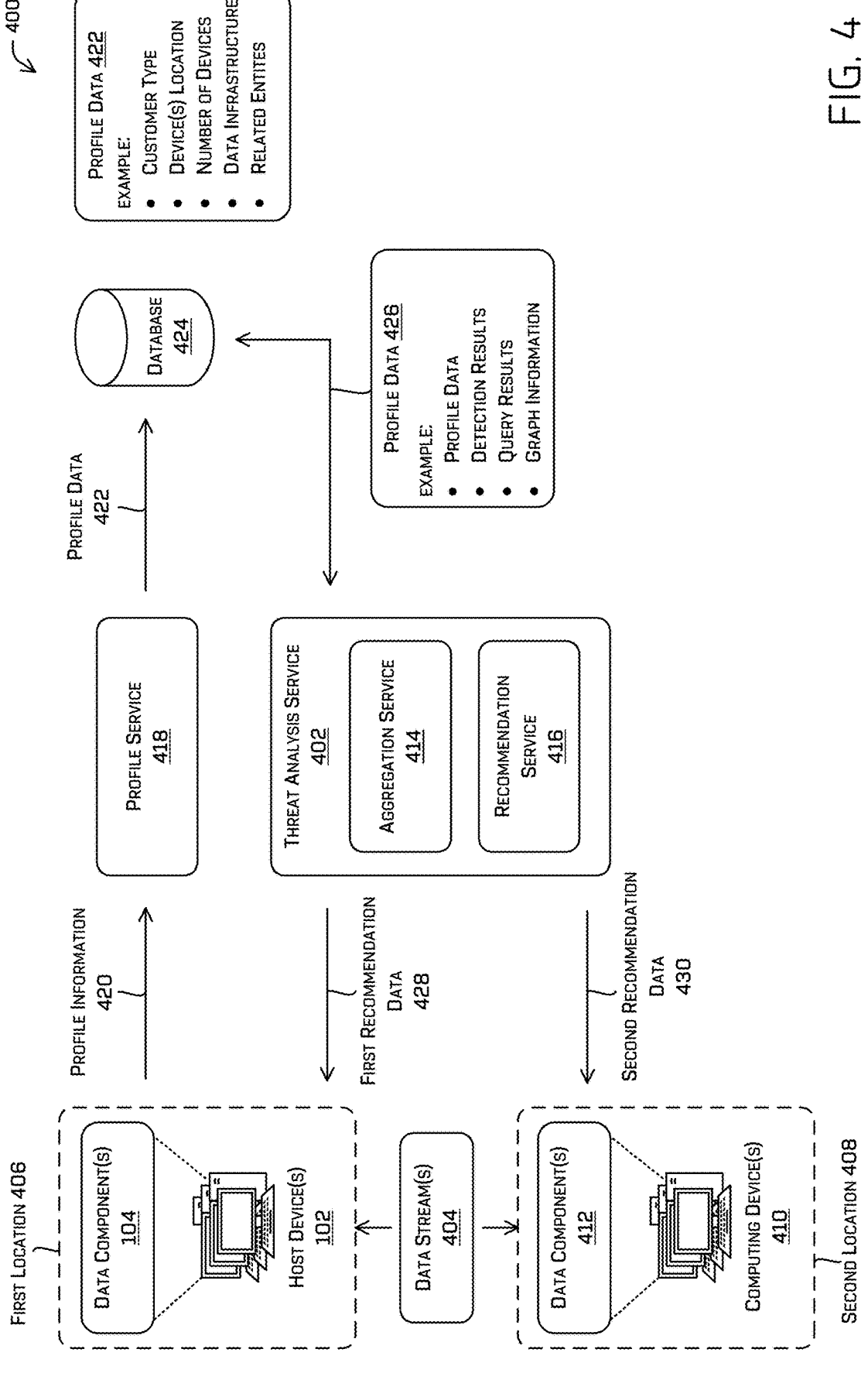
FIG. 4 is an illustration of an example environment in which an example threat analysis service implements techniques to exchange data with an example host device, as described herein.

FIG. 4 is an illustration of an example environment 400 in which an example threat analysis service implements techniques to exchange data with an example host device, as described herein. For example, a threat analysis service 402 can be implemented by the computing device(s) 108 to analyze data associated with previous threats, actor information, detections, and so on, to provide recommendation data associated with one or more data streams 404 in a first location 406 and/or a second location 408. The first location 406 can include the host device(s) 102 of FIG. 1 and the second location 408 can include one or more computing device(s) 410 (e.g., another geographical location associated with another organization) which further include one or more data components 412 (e.g., configured to include at least the functionality of the data component(s) 104). In various examples, the data stream(s) 404 can change dynamically over time as new instructions, processes, and so on are received into the data stream(s) 404.

As shown, the threat analysis service 402 includes an aggregation service 414 and a recommendation service 416 which can collectively perform the functionality of the aggregation component 110, the profile component 112, the graph generator 114, and/or the recommendation component 116. In some example, the functionality of the aforementioned components can be included in a single component (e.g., the aggregation component 110) or service (e.g., the recommendation service 416).

The environment 400 also includes a profile service 418 configured to receive profile information 420 (e.g., detailed information about an organization) and store the profile information 420 as profile data 422 in a database 424 for access by the threat analysis service 402. The threat analysis service 402 can exchange profile data 426 which can represent the profile data 422 (which is associated with a first organization), and additional profile data of additional organizations. The database 424 (or another database) can also store detection data, query results, visualizations, graphs (e.g., graphs generated from data from a single organization such as a threat graph and/or graphs generated from data aggregated from multiple organizations), and/or actor profiles for access by the threat analysis service 402.

The recommendation service 416 can generate first recommendation data 428 for sending to the host device(s) 102. In some examples, the first recommendation data 428 can include visualization information and associated metadata, as described herein.

In various examples, the recommendation service 416 can generate second recommendation data 430 for sending to the computing device(s) 410 based at least in part on a profile associated with an organization operating the computing device(s) 410 being similar to a profile associated with the profile data 422 (e.g., based on a value indicative of a similarity score). The second recommendation data 430 can be configured for sending responsive to determining that the first recommendation data 428 may be useful for the organization associated with the computing device(s) 410. In some examples, the second recommendation data 430 can be the same as, or a modified version of, the first recommendation data 428 (e.g., modified for presentation to a second organization).

FIG. 5 is a flowchart depicting an example process 500 for generating recommendation data usable to protect a data stream from a malicious event. Some or all of the process 500 may be performed by one or more components in FIG. 1 and/or one or more services of FIG. 4, as described herein. For example, some or all of process 500 may be performed by the computing device(s) 108 and/or the threat analysis service 402.

At operation 502, the process can include receiving first data comprising one or more of: malicious event information, technique information, or actor information. In some examples, the operation 502 can include the computing device(s) 108 receiving detection data associated with previous activity in a data stream of a computing device (e.g., a potentially malicious process or thread, an instruction to write data to a memory, file, or the like). The first data can include detection data from a plurality of organizations that are identified based on organization profiles having at least some similarity in attributes of the profiles.

At operation 504, the process can include receiving second data comprising a profile of an organization. For example, the computing device(s) 108 can receive profile data for one or more organizations associated with the first data indicating a size, a type, a location, or other attributes of the organization(s).

At operation 506, the process can include inputting the first data and the second data into a model. For instance, the computing device(s) 108 can input the detection data and the profile data into a model (e.g. machine learned model, heuristic model, statistical model, or a combination thereof) that is configured to provide a visualization (e.g., a graph, image, or other representation).

At operation 508, the process can include determining output data including a visualization of one or more of: a vulnerability, an actor, or malware associated with a malicious event. For instance, the model implemented by the computing device(s) 108 can output the visualization and metadata that identifies previous threats in the data stream.

At operation 510, the process can include determining that the organization is associated with a recommendation service. For instance, the computing device(s) 108 can verify that one or more host devices associated with the organization are authorized to receive data as part of a service, such as the recommendation service 416.

At operation 512, the process can include configuring recommendation data for a computing device, the recommendation data including the visualization and information indicating a portion of the data stream to protect from a future malicious event. For instance, the computing device(s) 108 can implement the recommendation component 116 to generate the recommendation data based at least in part on generating the visualization and authorizing the organization.

At operation 514, the process can include transmitting the recommendation data to the computing device for output by display device to protect the data stream from future malicious event. For example, the computing device(s) 108 can transmit the recommendation data over a computer network (e.g., the network(s) 106) to one or more host device associated with the organization.

Figure 6:
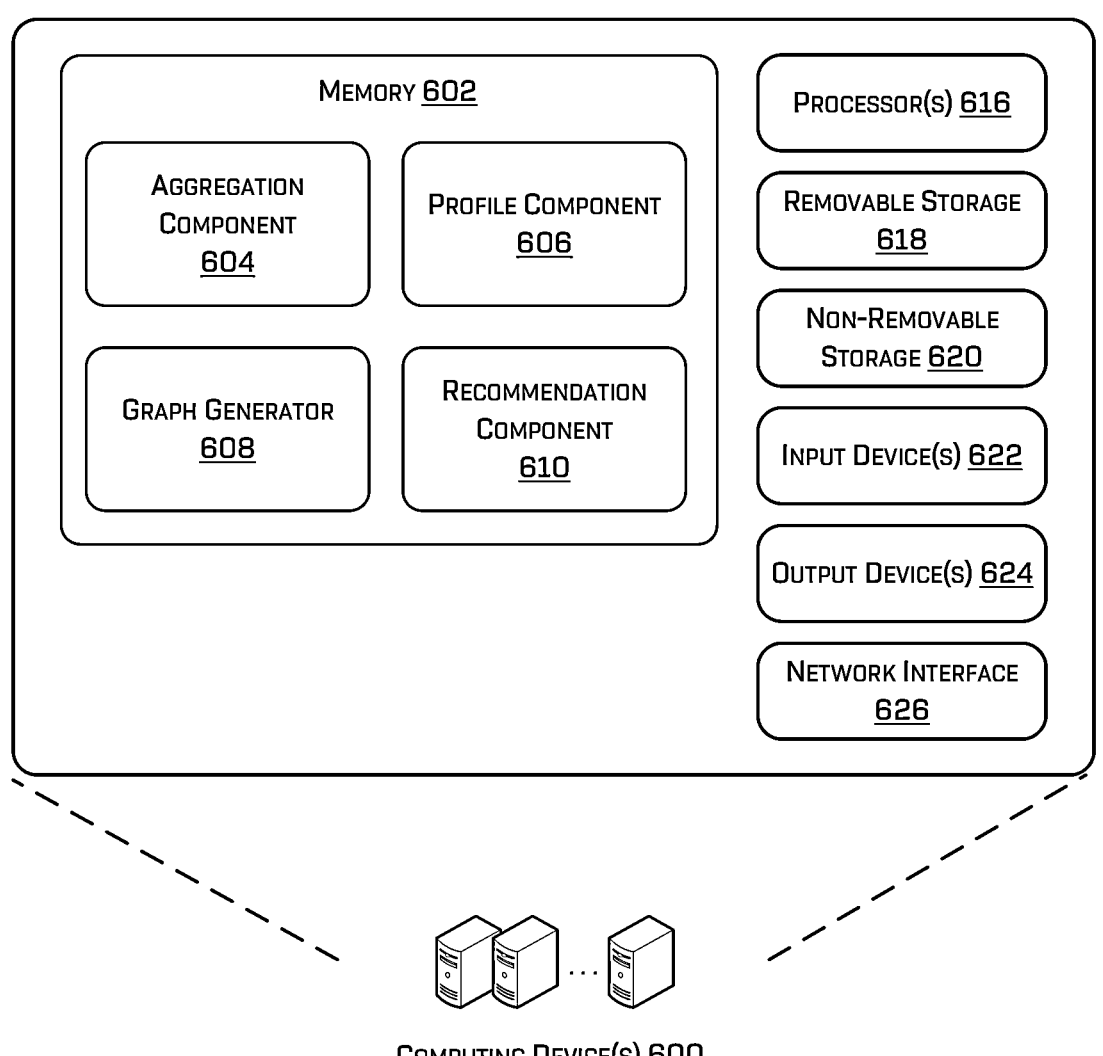
FIG. 6 is a block diagram of an illustrative computing architecture to implement the techniques describe herein.

FIG. 6 is a block diagram of an illustrative computing architecture of the computing device(s) 600. In some embodiments, the computing device(s) 600 can correspond to the host device(s) 102 or the computing device(s) 108 of FIG. 1. It is to be understood in the context of this disclosure that the computing device(s) 600 can be implemented as a single device or as a plurality of devices with components and data distributed among them. By way of example, and without limitation, the computing device(s) 600 can be implemented as various computing device 600(1), 600(2), . . . , 600(N) where N is an integer greater than 1.

As illustrated, the computing device(s) 600 comprises a memory 602 storing an aggregation component 604, a profile component 606, a graph generator 608, and a recommendation component 610. Also, the computing device(s) 600 includes processor(s) 616, a removable storage 618 and non-removable storage 620, input device(s) 622, output device(s) 624, and network interface 626.

In various embodiments, memory 602 is volatile (such as RAM), non-volatile (such as ROM, flash memory, etc.) or some combination of the two. The aggregation component 604, the profile component 606, the graph generator 608, and the recommendation component 610 stored in the memory 602 can comprise methods, threads, processes, applications or any other sort of executable instructions. The aggregation component 604, the profile component 606, the graph generator 608, and the recommendation component 610 can also include files and databases.

In various embodiments, the computer-readable memory 602 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 602 may also be described as computer storage media or non-transitory computer-readable media, and may include volatile and non-volatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the identified information and which can be accessed by the security service system. Any such memory 602 may be part of the security service system.

The aggregation component 604 may receive and store any client entity information and their associated security information including observed activity patterns received from the data component 104 on the respective host device(s) 102. The aggregation component 604 may gather data from other modules that may be stored in a data store. In some embodiments, the aggregation component 604 may gather and store data associated with known information, such as domain information that is associated with known entities, for use as enrichment data by the recommendation component 610 (or other component).

In some examples, the aggregation component 604 can correspond to, or otherwise include the functionality of, the aggregation component 110 of FIG. 1.

In some instances, the profile component 606 can correspond to, or otherwise include the functionality of, the profile component 112 of FIG. 1.

In some instances, the graph generator 608 can correspond to, or otherwise include the functionality of, the graph generator 114 of FIG. 1.

In some instances, the recommendation component 610 can correspond to, or otherwise include the functionality of, the recommendation component 116 of FIG. 1.

In some instances, any or all of the devices and/or components of the computing device(s) 600 may have features or functionality in addition to those that FIG. 6 illustrates. For example, some or all of the functionality described as residing within any or all of the computing device(s) 600 may reside remotely from that/those computing device(s) 600, in some implementations.

The computing device(s) 600 may be configured to communicate over a telecommunications network using any common wireless and/or wired network access technology. Moreover, the computing device(s) 600 may be configured to run any compatible device operating system (OS), including but not limited to, Microsoft Windows Mobile, Google Android, Apple iOS, Linux Mobile, as well as any other common mobile device OS.

The computing device(s) 600 also can include input device(s) 622, such as a keypad, a cursor control, a touch-sensitive display, voice input device, etc., and output device(s) 624 such as a display, speakers, printers, etc. These devices are well known in the art and need not be discussed at length here.

As illustrated in FIG. 6, the computing device(s) 600 also includes the network interface 626 that enables the computing device(s) 600 of the security service system to communicate with other computing devices, such as any or all of the host device(s) 102.

FIGS. 2, 3, and 5 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. For instance, the example process of FIG. 5 may omit operation 510 and 514 while the example process of FIG. 3 may omit operation 302.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For instance, the process 500 may omit operation 510 and/or operation 514. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed processes could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
  receiving detection data comprising a) first malicious event information in a first data stream associated with a first computing device of a first organization, b) second malicious event information in a second data stream associated with a second computing device of a second organization, c) technique information identifying one or more techniques associated with a malicious event in the first data stream or the second data stream, and d) actor information identifying a source of the first malicious event information or the second malicious event information;
receiving profile data comprising a first profile of the first organization and a second profile of the second organization, the first profile comprising one or more of: a location of the first computing device, a size of the first organization, an organization type, data infrastructure information, or subsidiary information;
inputting the detection data and the profile data comprising the first profile of the first organization and the second profile of the second organization into a model;
determining, based on the model processing the detection data and the profile data comprising the first profile and the second profile, a visualization indicating one or more of: vulnerabilities exposed during the malicious event, an actor that initiated the malicious event, or malware executed in association with the malicious event; and
configuring recommendation data for the first computing device, the recommendation data including the visualization and information indicating a portion of the first data stream to protect from a future malicious event.

2. The system of claim 1, wherein:
the detection data further comprises a first graph to represent the first malicious event information and a second graph to represent the second malicious event information;
the malicious event identifies a malicious process or thread in the first data stream or the second data stream; and
the visualization represents a graph, a map, an image, a diagram, or an animation.

3. The system of claim 1, wherein the model is a first model, and the operations further comprising:
outputting the visualization to a second model or a human; and
receiving input from the second model or the human to modify the visualization as a modified visualization,
wherein the recommendation data comprises the modified visualization.

4. The system of claim 1, the operations further comprising:
receiving a message from the first computing device of the first organization requesting the recommendation data for protecting the first data stream from the future malicious event;
accessing, based at least in part on receiving the message, the first profile associated with the first computing device and the second profile associated with the second organization from a database,
wherein configuring the recommendation data is based at least in part on accessing the first profile and the second profile from the database.

5. The system of claim 1, the operations further comprising:
determining metadata describing the visualization, the metadata comprising one or more of: a location of the malicious event, an average size of the first organization and the second organization, the organization type, a human-readable name of the visualization, a creation time of the visualization, one or more profiles used to generate the visualization;

associating the metadata and the visualization as a visualization profile; and storing the visualization profile in a database.

6. The system of claim 5, the operations further comprising:

receiving a message from a third computing device requesting security information to protect a third data stream from a potential malicious event;

identifying a third profile associated with the third computing device;

comparing, based at least in part on receiving the message, the metadata of the visualization profile with information of the third profile to identify similarity between the visualization profile and the third profile; and transmitting the recommendation data to the third computing device based at least in part on the comparing.

7. One or more non-transitory computer-readable media storing instructions executable by one or more processors, wherein the instructions, when executed, cause the one or more processors to perform operations comprising:

receiving first data comprising a) first malicious event information in a first data stream associated with a first computing device of a first organization, b) second malicious event information in a second data stream associated with a second computing device of a second organization, and c) technique information identifying one or more techniques associated with a malicious event in the first data stream or the second data stream;

receiving second data comprising a first profile of the first organization and a second profile of the second organization, the first profile comprising first characteristics comprising one or more of: a location of the first computing device, a size of the first organization, an organization type, data infrastructure information, or subsidiary information;

inputting the first data and the second data comprising the first profile of the first organization and the second profile of the second organization into a model, the model configured to compare the first characteristics of the first profile and second characteristics of the second profile;

determining, by the model, output data including a visualization indicating one or more of: vulnerabilities exposed during the malicious event, an actor that initiated the malicious event, or malware executed in association with the malicious event; and configuring third data for the first computing device, the third data including the visualization and information indicating a portion of the first data stream to protect from a future malicious event.

8. The one or more non-transitory computer-readable media of claim 7, the operations further comprising:

determining that the first organization is associated with a security recommendation service, wherein configuring the third data is based at least in part on the first organization being associated with the security recommendation service.

9. The one or more non-transitory computer-readable media of claim 7, wherein:

the first data further comprises actor information identifying a source of the first malicious event information or the second malicious event information.

10. The one or more non-transitory computer-readable media of claim 7, wherein:

the first data further comprises a first graph to represent the first malicious event information and a second graph to represent the second malicious event information;

the malicious event identifies a malicious process or thread in the first data stream or the second data stream; and the visualization represents a graph, a map, an image, a diagram, or an animation.

11. The one or more non-transitory computer-readable media of claim 7, wherein the model is a first model, and the operations further comprising:

outputting the visualization to a second model or a human; and receiving input from the second model or the human to modify the visualization as a modified visualization, wherein the third data comprises the modified visualization.

12. The one or more non-transitory computer-readable media of claim 7, the operations further comprising:

receiving a message from the first computing device requesting recommendation data for protecting the first data stream from the future malicious event; and accessing, based at least in part on receiving the message, the first profile associated with the first computing device from a database, wherein configuring the third data is based at least in part on accessing the first profile.

13. The one or more non-transitory computer-readable media of claim 7, the operations further comprising:

determining metadata describing the visualization, the metadata comprising one or more of: a location of the malicious event, an average size of the first organization and the second organization, the organization type, a human-readable name of the visualization, a creation time of the visualization, one or more profiles used to generate the visualization;

associating the metadata and the visualization as a visualization profile; and storing the visualization profile in a database.

14. The one or more non-transitory computer-readable media of claim 7, wherein:

the information in the third data identifies previous malicious behavior initiated by the actor to enable a human associated with the first computing device to understand a reason for the future malicious event.

15. The one or more non-transitory computer-readable media of claim 7, wherein the third data represents recommendation data, and the operations further comprising:

receiving a set of profiles representing different organizations;

comparing first information associated with the recommendation data with respective information associated with each profile in the set of profiles; and transmitting the recommendation data to a third computing device to protect a third data stream from the future malicious event.

16. The one or more non-transitory computer-readable media of claim 7, the operations further comprising:

determining a similarity score between the first profile and the second profile associated with the second organization;

comparing the similarity score to a threshold value; and determining the output data comprising the visualization based at least in part on the similarity score being equal or above the threshold value.

17. A computer-implemented method comprising:

receiving first data comprising a) first malicious event information in a first data stream associated with a first computing device of a first organization, b) second malicious event information in a second data stream associated with a second computing device of a second organization, and c) technique information identifying one or more techniques associated with a malicious event in the first data stream or the second data stream;

receiving second data comprising a first profile of the first organization and a second profile of the second organization, the first profile comprising first characteristics comprising one or more of: a location of the first computing device, a size of the first organization, an organization type, data infrastructure information, or subsidiary information;

inputting the first data and the second data comprising the first profile of the first organization and the second profile of the second organization into a model, the model configured to compare the first characteristics of the first profile and second characteristics of the second profile;

determining, based on the model, output data indicating one or more of: vulnerabilities exposed during the malicious event, an actor that initiated the malicious event, or malware executed in association with the malicious event; and configuring third data for the first computing device, the third data including the output data and information indicating a portion of the first data stream to protect from a future malicious event.

18. The computer-implemented method of claim 17, wherein:

the first data further comprises a first graph to represent the first malicious event information and a second graph to represent the second malicious event information;

the malicious event identifies a malicious process or thread in the first data stream or the second data stream; and the output data represents a graph, a map, an image, a diagram, or an animation.

19. The computer-implemented method of claim 17, further comprising:

receiving a message from the first computing device requesting recommendation data for protecting the first data stream from the future malicious event; and accessing, based at least in part on receiving the message, the first profile associated with the first computing device from a database, wherein configuring the recommendation data is based at least in part on accessing the first profile.

20. The computer-implemented method of claim 17, wherein the output data comprises a visualization, and further comprising:

determining metadata describing the visualization, the metadata comprising one or more of: a location of the malicious event, an average size of the first organization and the second organization, the organization type, a human-readable name of the visualization, a creation time of the visualization, one or more profiles used to generate the visualization;

associating the metadata and the visualization as a visualization profile; and storing the visualization profile in a database.

* * * * *